United States Patent
Den Hollander et al.

(10) Patent No.: US 10,549,154 B2
(45) Date of Patent: Feb. 4, 2020

(54) WORKOUT SENSING SYSTEM

(71) Applicants: Bryan Den Hollander, Ann Arbor, MI (US); Corina McIntyre, Mattawan, MI (US)

(72) Inventors: Bryan Den Hollander, Ann Arbor, MI (US); Corina McIntyre, Mattawan, MI (US)

(73) Assignee: ForzaMetrix, LLC, Eaton Rapids, MI (US)

(*) Notice: Subject to any disclaimer, the term of this patent is extended or adjusted under 35 U.S.C. 154(b) by 90 days.

(21) Appl. No.: 15/690,459

(22) Filed: Aug. 30, 2017

(65) Prior Publication Data

US 2018/0056127 A1 Mar. 1, 2018

Related U.S. Application Data (60) Provisional application No. 62/382,387, filed on Sep. 1, 2016.

(51) Int. Cl.
*A63B 24/00* (2006.01)
*A63B 21/00* (2006.01)
(Continued)

(52) U.S. Cl.
CPC ........ *A63B 24/0062* (2013.01); *A63B 21/063* (2015.10); *A63B 21/075* (2013.01);
(Continued)

(58) Field of Classification Search
CPC .......... A63B 21/0004; A63B 21/00058; A63B 21/00061; A63B 21/00065; A63B 21/00069; A63B 21/00076; A63B 21/072; A63B 21/0724; A63B 21/0726; A63B 21/0728; A63B 21/075; A63B 21/08; A63B 21/4023; A63B 21/4027; A63B 21/4033; A63B 21/4035; A63B 21/4041; A63B 21/4043; A63B 24/0003; A63B 24/0021; A63B 24/0062; A63B 24/0075; A63B 2024/0065; A63B 2024/0078; A63B 71/06; A63B 71/0619; A63B 71/0622; A63B 71/0686; A63B 2071/0647; A63B 2071/065; A63B 2071/0658; A63B 2071/0675; A63B 2071/0694;
(Continued)

(56) References Cited

U.S. PATENT DOCUMENTS

| 4,647,038 A * | 3/1987 | Noffsinger | A63B 21/072 482/106 |
| 7,163,488 B2 * | 1/2007 | Anders | A63B 21/0724 482/104 |

(Continued)

*Primary Examiner* — Gary D Urbiel Goldner
(74) *Attorney, Agent, or Firm* — WSU Patent Procurement Clinic (57) ABSTRACT

A workout sensing system for collecting and transmitting strength training related data from components embedded within a sleeve of a strength training device such as a barbell, lat bar, or close grip seated row bar. The strength training device tracks metrics including load, repetitions, sets, power, velocity, force, and form. The workout sensing system is comprised of hardware and software that may enable a cloud based platform to analyze a user's strength training data so the user may track and optimize their strength performance in the weight room.

8 Claims, 9 Drawing Sheets

(51) Int. Cl.
*A63B 71/06* (2006.01)
*A63B 21/075* (2006.01)
*A63B 21/062* (2006.01)
*A63B 21/072* (2006.01)
*H04W 84/12* (2009.01)
*H04W 4/80* (2018.01)

(52) U.S. Cl.
CPC ........ *A63B 21/0724* (2013.01); *A63B 21/151* (2013.01); *A63B 21/4035* (2015.10); *A63B 24/0003* (2013.01); *A63B 24/0075* (2013.01); *A63B 71/0622* (2013.01); *A63B 2220/17* (2013.01); *A63B 2220/20* (2013.01); *A63B 2220/40* (2013.01); *A63B 2220/50* (2013.01); *A63B 2220/56* (2013.01); *A63B 2220/62* (2013.01); *A63B 2220/833* (2013.01); *A63B 2225/15* (2013.01); *A63B 2225/50* (2013.01); *H04W 4/80* (2018.02); *H04W 84/12* (2013.01)

(58) Field of Classification Search
CPC ............ A63B 2220/17; A63B 2220/20; A63B 2220/30; A63B 2220/31; A63B 2220/36; A63B 2220/40; A63B 2220/50; A63B 2220/52; A63B 2220/58; A63B 2220/62; A63B 2220/64; A63B 2220/80; A63B 2220/801; A63B 2220/802; A63B 2220/803; A63B 2220/805; A63B 2220/806; A63B 2220/807; A63B 2220/83; A63B 2220/833; A63B 2220/89; A63B 2225/02; A63B 2225/15; A63B 2225/20; A63B 2225/50; A63B 2225/52; A63B 2225/54; A63B 2244/09
See application file for complete search history.

(56) References Cited

U.S. PATENT DOCUMENTS

| | | | | |
|---|---|---|---|---|
| 7,455,621 | B1* | 11/2008 | Anthony | A63B 21/0724 482/3 |
| 7,575,537 | B2* | 8/2009 | Ellis | A63B 21/00076 482/5 |
| 7,666,118 | B1* | 2/2010 | Anthony | A63B 21/0724 482/104 |
| 8,602,945 | B1* | 12/2013 | Haubrich | A63B 71/0622 482/1 |
| 9,126,072 | B2 | 9/2015 | Watterson | |
| 9,135,347 | B2* | 9/2015 | Damman | G06F 16/951 |
| 9,318,030 | B2 | 4/2016 | Harris | |
| 9,339,692 | B2* | 5/2016 | Hashish | A63B 21/0058 |
| 9,381,399 | B2 | 7/2016 | Adel | |
| 9,468,793 | B2 | 10/2016 | Salmon | |
| 9,623,285 | B1* | 4/2017 | Ruiz | A63B 24/0062 |
| 9,789,360 | B1* | 10/2017 | Schaffer | A63B 24/0062 |
| 2003/0211916 | A1 | 11/2003 | Capuano | A63B 21/072 482/8 |
| 2007/0042866 | A1* | 2/2007 | Skilken | A63B 21/00 482/8 |
| 2008/0090703 | A1 | 4/2008 | Rosenberg | |
| 2008/0242513 | A1* | 10/2008 | Skilken | A63B 21/00 482/8 |
| 2008/0287267 | A1* | 11/2008 | Ellis | A63B 21/00076 482/54 |
| 2012/0165165 | A1* | 6/2012 | Iankov | A63B 71/0608 482/106 |
| 2013/0288859 | A1* | 10/2013 | Watterson | A63B 24/0062 482/8 |
| 2014/0235409 | A1* | 8/2014 | Salmon | A63B 21/0724 482/8 |
| 2015/0038303 | A1* | 2/2015 | Adkins | A63B 21/075 482/108 |
| 2015/0367162 | A1* | 12/2015 | Mueller | A63B 21/0058 482/94 |
| 2016/0101320 | A1* | 4/2016 | Tsutsui | A63B 21/0722 482/8 |
| 2016/0310789 | A1* | 10/2016 | Emerson | A63B 24/0062 |
| 2016/0346617 | A1* | 12/2016 | Srugo | G09B 19/0038 |
| 2017/0128765 | A1* | 5/2017 | Garretson | A63B 71/0622 |
| 2018/0156657 | A1* | 6/2018 | Lee | G01C 19/00 |

* cited by examiner

WORKOUT SENSING SYSTEM

REFERENCE TO RELATED APPLICATIONS

This application claims priority to U.S. Provisional Application No. 62/382,387 filed Sep. 1, 2016, which is incorporated herein in its entirety.

FIELD OF THE INVENTION

This application relates generally to the field of physical fitness. More specifically, this application relates to fitness equipment.

BACKGROUND OF THE INVENTION

The statements in this section merely provide background information related to the present disclosure and are not admitted prior art.

People of all backgrounds with a variety of fitness goals use workout equipment to improve their strength, health, and overall well-being. Athletes utilize workout equipment off the field to supplement their athletic performance on the field in sports such as football, cycling, basketball, water polo, and running. Bodybuilders use workout equipment to improve their physique and win competitions. Members of the military use workout equipment to maintain rigorous physical performance standards for the purpose of staying physically fit for duty. Some gym goers use workout equipment with a focus on burning calories and losing weight. Others use workout equipment to strengthen their bodies and consequently improve physical and mental health.

Athletes, bodybuilders, and anyone following a serious training program will track their progress so as to make adjustments and improvements that lead to accomplishing their fitness objectives. Tracking progress helps maintain consistency even when the bodily improvements are not obvious, such as in the early stages of a new workout routine.

Without a system to accurately record and analyze fitness performance, people who want to become stronger and more physically fit do not have an easy and consistent way to track their strength training progress and therefore do not have a way to stick with their strength training workout regime.

Automating the process of tracking workouts is advantageous in many ways. At the outset, it eliminates the tedious process of an individual manually entering information about workouts. Also, automated tracking allows for different types of information to be recorded. Certain metrics such as average and instantaneous power can be captured by automated tracking that are not easily measured in other ways. This data can then be analyzed in a variety of forms to provide deeper insights.

Automation requires sensors or detectors that are embedded in workout equipment. Despite the fact that fully automated tracking solutions currently exist to track workouts for endurance sports, there currently does not exist a fully automated solution for tracking gym workouts that utilize strength training equipment.

For instance, the barbell is a piece of strength training workout equipment that is commonly used in gyms. It described as an elongated cylindrical or squared bar with two ends, each end adapted to accept weights, and a gripping portion is located between each end. It can be used in many exercises, such as bench press, arm curl, power clean, or squat.

The lat bar is another piece of strength training workout equipment that is commonly used in gyms. It is generally clipped to a cable that is connected to a stack of weights. It can be used for exercises such as lat pulldown, cable rows, and cable curls.

The close grip seated row bar is another example of a piece of strength training workout equipment that is commonly used in gyms. It is also clipped to a cable that is connected to a stack of weights. It has many uses, but is generally used for seated cable rows.

A workout sensing system which tracks workouts utilizing the barbell, lat bar, close grip seated row bar, or any other similar device would be useful in many gym applications. It would provide a better way to manage mass training programs implemented by the military, high school, college, and professional athletic programs. It would provide more data and better analytics for the coaches of Olympic and professional athletes. Bodybuilders would no longer need to manually enter their workouts. Those trying to lose weight would be able to track calories burned during the strength training portion of their workout. And regardless of goals, these sensors or detectors would provide everyone with an accurate way to record their workouts for future reference and motivation.

SUMMARY OF THE INVENTION

The present invention provides users with a workout sensing system for recording accurate data on their strength training workouts. The workout sensing system would then analyze relevant data concerning workout parameters and provide feedback to users as a virtual personal trainer. These capabilities will motivate people to maintain strength training workouts in their fitness regime, ultimately enhancing their physical health and wellbeing.

The present invention improves upon current devices used for workouts by enabling these devices to detect, process, and transmit metrics associated with workouts. This may be achieved by embedding specialized components such as microprocessors, detectors, transceivers, and other supporting hardware into a device commonly used for exercise, which conveniently lack those components.

According to one particular aspect, the present invention provides a workout sensing system including a detector for sensing a physical metric that changes as weight is connected to the workout sensing system, a detector for sensing a physical metric that indicates the number of repetitions performed with the workout sensing system, a detector for sensing a physical metric that indicates the distance traveled during a repetition, a detector for sensing a physical metric that indicates the passage of time, and a detector for sensing a physical metric that indicates a user's identification.

According to another particular aspect, the present invention provides a workout sensing system including a processor to process the physical metrics, and a display to inform the users of these physical metrics.

According to yet another aspect, the present invention provides a workout sensing system including a transmitter to wirelessly communicate via BLUETOOTH, WiFi, or any other communication protocol with various devices such as a watch, phone, wristband, or pass card.

According to yet another aspect, the present invention provides a device that will first log data relating to a user's workout. The data is collected via the sensors or detectors. The processor receives the latest sample of data from each sensor or detector, constructs it into a message, then transmits the message to either a phone or the cloud. The data is then processed and then displayed on the device, or it may be displayed remotely, such as on the user's phone, watch, or on a website.

According to still yet another aspect, the present invention provides a workout system in which a user may log into a device, such as their phone, a fingerprint scanner, wirelessly enabled card, the proximity of a chip enabled wristband, facial recognition, or other authorization approach. The user ID functionality may work via near field communication or BLUETOOTH. For example, in one alternative the user can connect to the device by putting their phone near the NFC chip, which will in turn set up the BLUETOOTH communication. A second method is to simply directly connect to the device via BLUETOOTH. Once the user is connected to the bar via BLUETOOTH, the mobile app will identify the user to the device.

Further areas of applicability of the present disclosure will become apparent from the detailed description, the claims and the drawings. The detailed description and specific examples are intended for purposes of illustration only and are not intended to limit the scope of the disclosure.

DETAILED DESCRIPTION OF THE INVENTION

One purpose of the workout sensing system is to provide data corresponding to a user's exercise that enables logging, tracking, and analysis of the user's exercise routine. A layer of software, which may be artificial intelligence software, may then analyze a user's workout data and suggest workouts.

Figure 1:
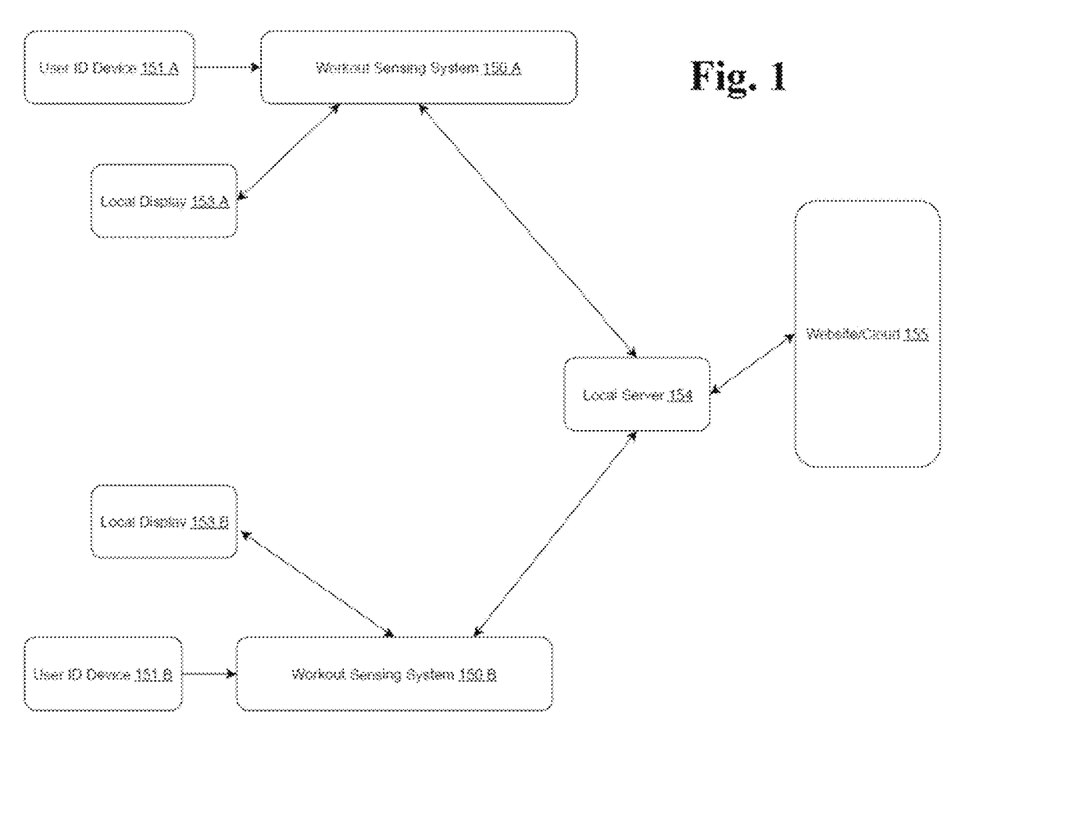
FIG. 1 is a simplified view illustrating how multiple workout sensing systems may communicate with other devices.

FIG. 1 shows an overview of how multiple workout sensing systems might communicate with other devices. In this example, the workout sensing system 150 may be incorporated into a piece of strength training workout equipment at a gym, or some other workout device. For example, the workout sensing system 150 of the present invention may be incorporated into a barbell, lat bar, or row bar.

In one embodiment, a user may identify oneself to the workout sensing system 150 with a user identification device 151. An example of a user identification device 151 may be a near field communication enabled card, a smartphone, or a watch. The workout sensing system 150 may then send workout data to a local display 153 and/or, optimally, to a local server 154. Local display 153 may be a user's smartphone, a tablet, or a display in the gym, or any other device, or it may not be present. One way in which this process can occur is as follows: Local server 154 would collect data from multiple workout sensing systems 150, then send it to a remote website/cloud 155. The website/cloud 155 would then analyze the data and display it to the user via a mobile app or web browser.

Figure 2:
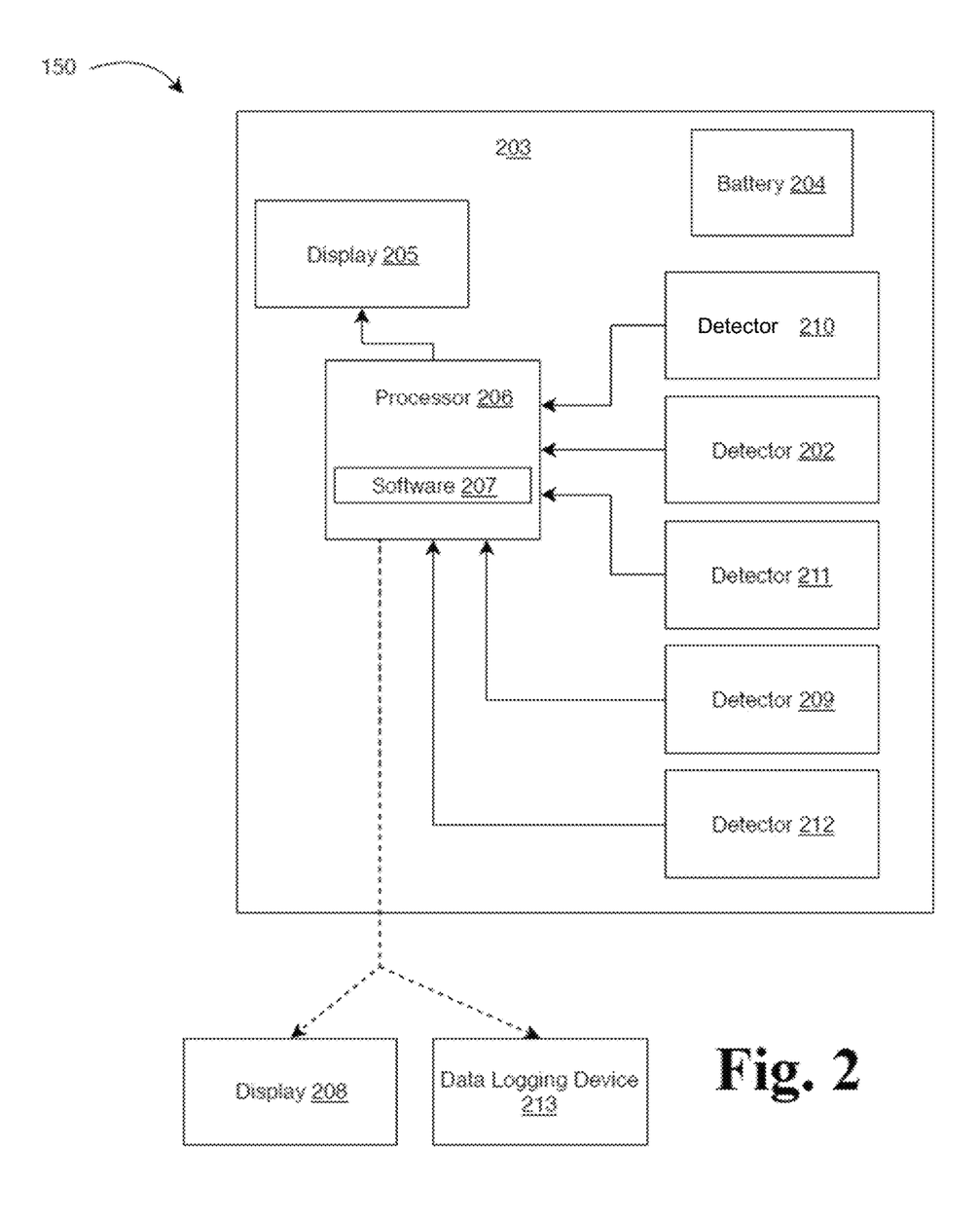
FIG. 2 shows one workout sensing system embodiment.

Referring to FIG. 2, the workout sensing system 150 may be embedded in a piece of strength training workout equipment 203. The workout sensing system 150 consists of components which are electrically connected including detector(s) 202, 209, 210, 211, and 212, a processor 206, an internal display 205 and/or an external display 208, and a data-logging device 213. A battery 204 may be used to power a processor 206, detector(s) 202, 209, 210, 211, 212 and display 205/208. The detector 209 may be an accelerometer, an inertial measurement unit or other device well known in the art. The detector 202 is for example a load cell, an array of multiple load cells, a strain gauge or an array of multiple strain gauges, or a pressure sensor. The display 205/208 is for example a liquid crystal display or any other device to display data to the user. The detector 210 is for example an inertial measurement unit, a lidar range finder, or an ultrasonic range finder. The detector 211 is for example a real-time clock. The detector 212 is for example a near field communication transceiver, WiFi or a BLUETOOTH communication transceiver, fingerprint scanner, or facial recognition detector. Multiple accelerometers may be used (e.g., triaxial accelerometer). Where a remote display is used, a wireless communication transceiver may also be used. The data logging device 213 may be a server, and may communicate with processor 206 via wireless communication.

Figure 3A:
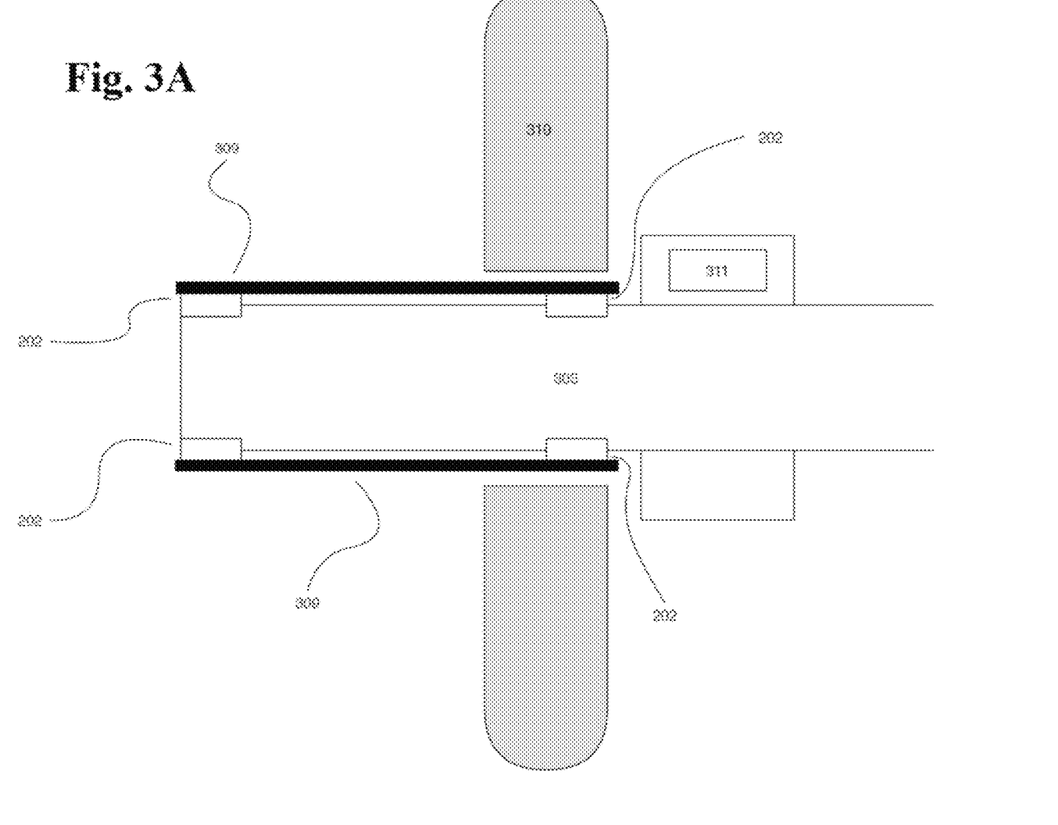
FIG. 3A shows one part of a device with a workout sensing system embedded.
Figure 3B:
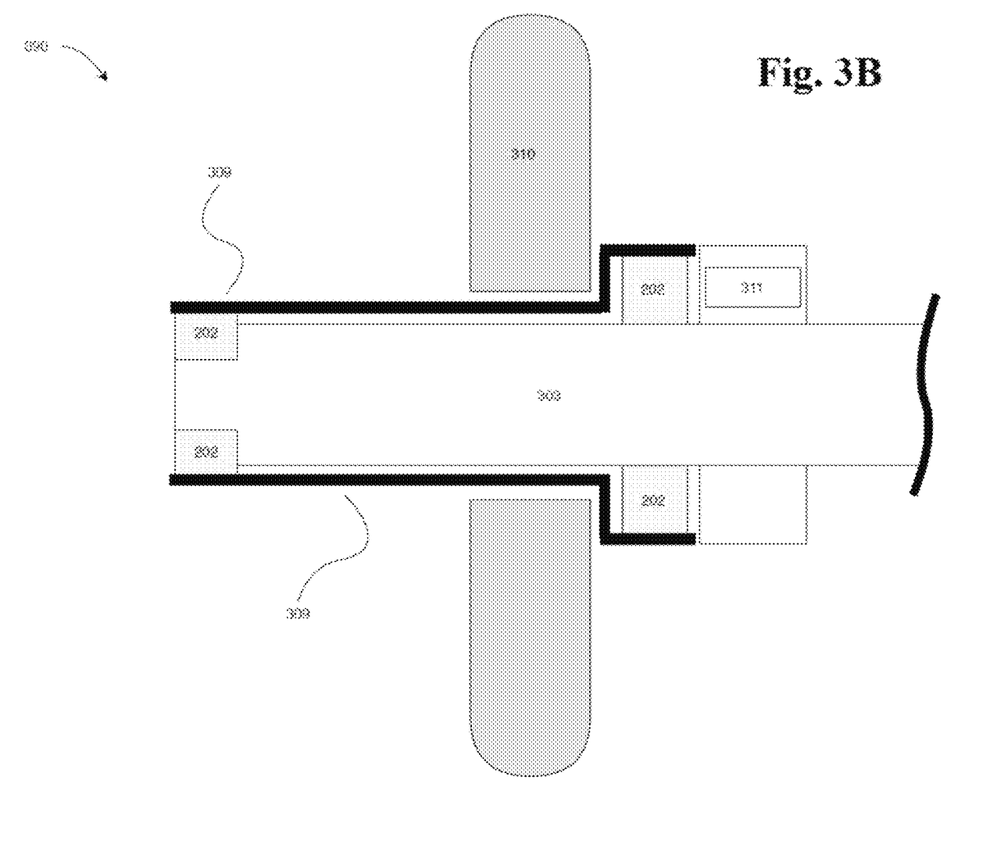
FIG. 3B shows another example of a device with workout sensing system embedded.

FIGS. 3A and 3B illustrate different exemplary embodiments of workout sensing system 150 in accordance with the present invention.

FIG. 3A is a cross-sectional side view of one part of an exemplary barbell embodiment 303 incorporating the workout sensing system 150 of the present invention. A weight 310 is shown on barbell 303 (note, weight 310 is shown in FIG. 3A for illustrative purposes). The detectors 202, are an exemplary part of a detector array. Each detector 202 is for example a load cell, a strain gauge, or a pressure sensor. The rest of workout sensing system 150 may be embedded in within the sleeve of the barbell, location 311, or another location on the bar.

FIG. 3B shows another exemplary barbell embodiment incorporating the workout sensing system 150. It will be understood that this embodiment is similar to the embodiment in FIG. 3A to the extent not otherwise described herein. The two embodiments differ by incorporating a different implementation for force detection. The detectors 202 detect load and may be a load cell, pressure sensor, strain gauge, or more specifically a spoke type load cell. A sleeve 309 has a larger diameter on one end to accommodate detector 202. The bar 303 has a reduced diameter on the end to accommodate detector 202.

Figure 4A:
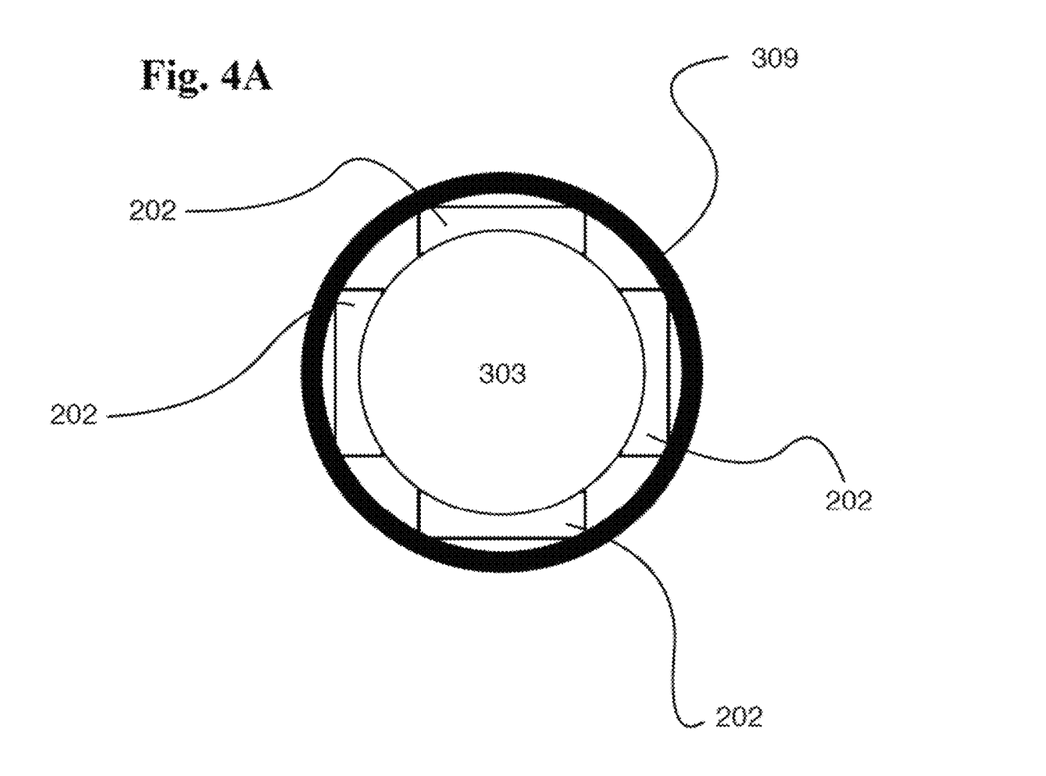
FIG. 4A is an end view of a device and force detector configuration.
Figure 4B:
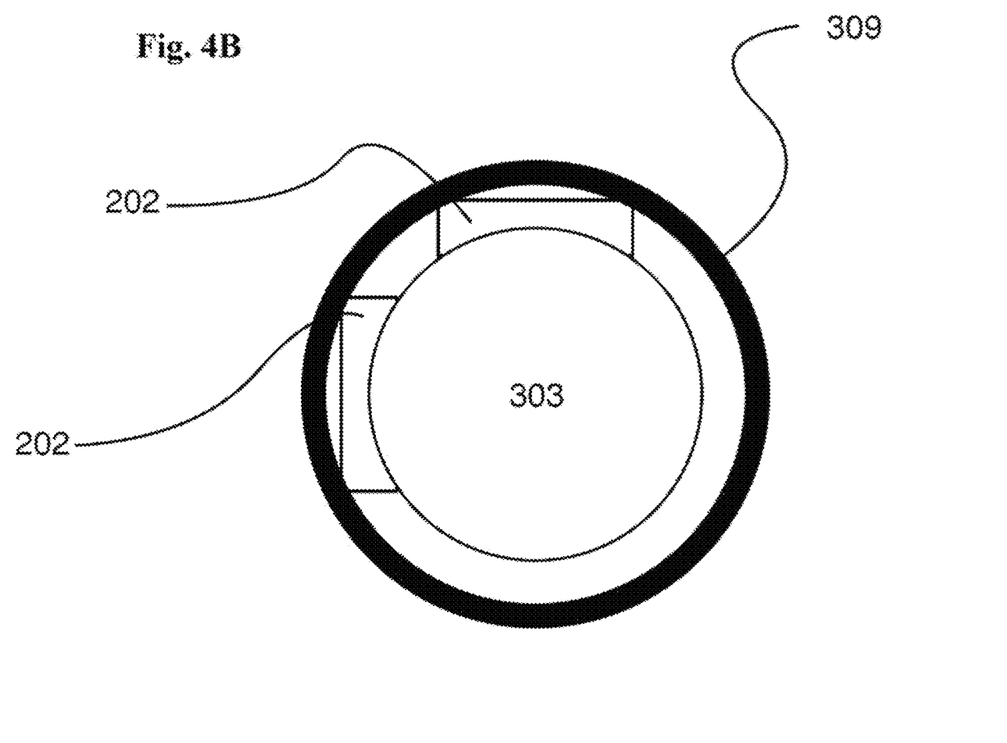
FIG. 4B another end view of a device and force detector configuration.
Figure 4C:
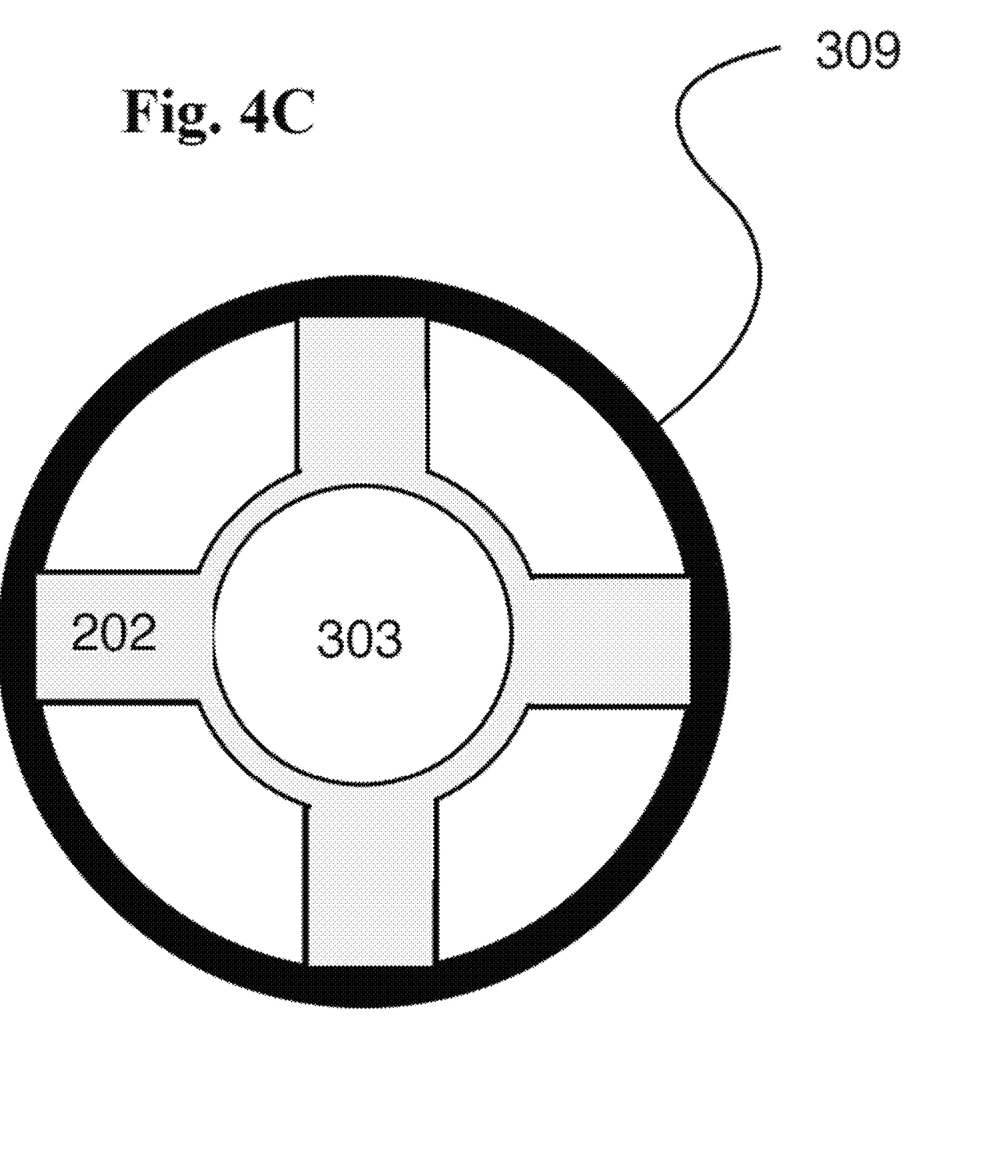
FIG. 4C another end view of a device and force detector configuration.

FIGS. 4A, 4B, and 4C, show one embodiment of the workout sensing system 150 described in 3A.

FIG. 4A shows an end view of one part of an exemplary device 303 embedded with the workout sensing system 150. In the embodiment illustrated, the device 303 may include a plurality of detectors. For example, the device 303 may include a group of four detectors 202 is shown. More or less detectors 202 may be incorporated in the system. Detectors 202 may be arranged around the axis of bar 303. Other examples of an array of detectors 202 could include any quantity of detectors. Sleeve 309 distributes load across detectors 202.

FIG. 4B is the same view as FIG. 4A, however it shows another exemplary array of two detectors 202.

FIG. 4C is the end view similar to FIG. 4A and FIG. 4B, however, this view corresponds to the device described in FIG. 3D. FIG. 4C describes one example of detectors 202. In this example, detectors 202 are spoke type load cells.

Figure 5:
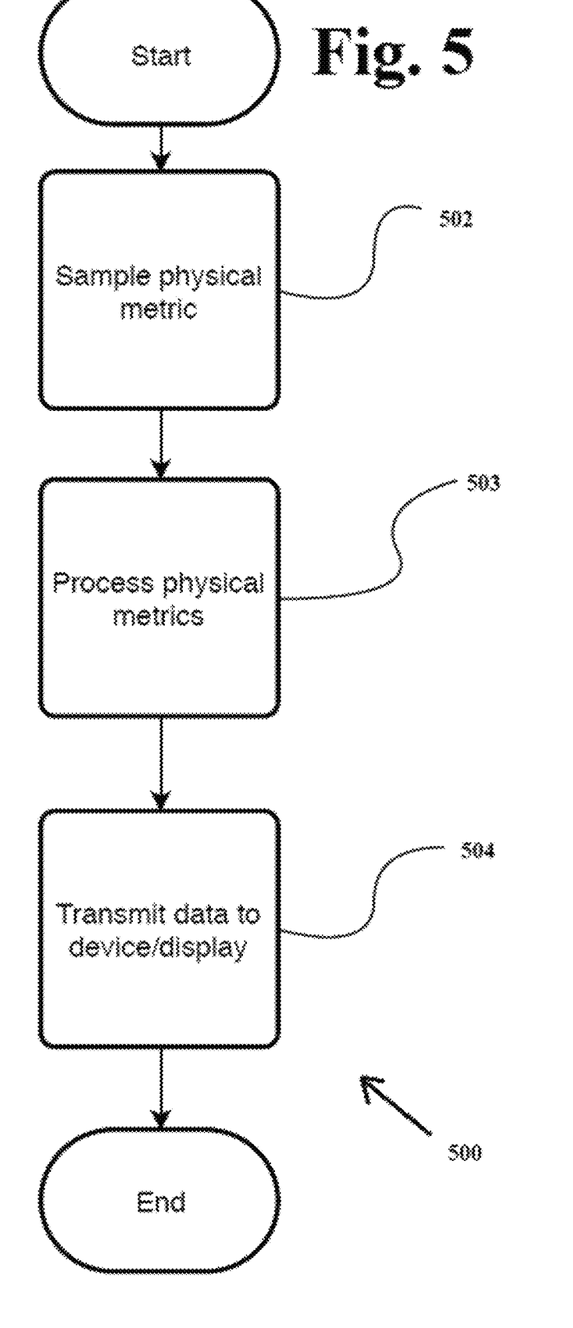
FIG. 5 shows an exemplary process performed by the processor.

Referring to FIG. 5, schematically illustrates an overview of the data processing. Processor 206 samples multiple detectors in step 502, processes the signal in step 503, and transmits the data to a logging device or a display in step 504, either embedded or remote. The following paragraphs describe specific exemplary processes that may be executed by processor 206.

In an embodiment of process 500, the detector that is sampled in step 502 is an accelerometer and therefore the physical metric is acceleration. In step 503, the processor 206 processes the physical metric to assess whether the metric indicates repetition of the device. In step 704 repetition information is displayed to the user.

In another embodiment of process 500 the detectors sampled in step 502 are an array of load cells and an accelerometer. The physical metrics are therefore strain and acceleration. In step 503, these physical metrics will be processed to determine the force vector exerted on the device. This is determined by calculating the acceleration vector of the device and the individual force vectors for each detector (detector configurations may be as shown in FIG. 3A, FIG. 4A, FIG. 4B, FIG. 4C or as shown in FIG. 3B). By summing the components of each force vector that are parallel to the acceleration vector, the magnitude of the force vector may be determined then displayed in step 504.

Another embodiment of process 500 may determine and display the mass connected to the device. For this process, force may be determined as previously described. The detector that is sampled in step 502 may be an accelerometer and therefore the physical metric is acceleration. This physical metric may be processed in step 503 to determine the acceleration vector of the device. Weight connected to the devices can be calculated by processing the force and acceleration vectors to determine mass. This step 503 may be, for example, dividing force by acceleration to determine mass, which may then be displayed in step 504.

Another embodiment of process 500 may determine the maximum displacement during a repetition. An accelerometer may be sampled in step 502 and therefore the physical metric is acceleration. In step 503 this physical metric will be processed to determine the maximum displacement during a repetition. This process may, for example, be a double integration. The maximum displacement may then be displayed in step 504.

Another embodiment of process 500 may determine the average power over the span of a repetition. An accelerometer may be sampled in step 502 and therefore the physical metric is acceleration. Force may be calculated in step 503 as previously shown, along with the accelerometer data to determine average power over a repetition. This data may then be displayed in step 504.

Another embodiment of process 500 may determine the duration of a repetition or set of repetitions. A real time clock may be sampled in step 702, and therefore the physical metric is time. Duration of a repetition may then be determined in step 503 and displayed in step 504.

Another embodiment of process 500 may determine the identification of a user. The detector may be a wireless transceiver, a fingerprint scanner, or a facial recognition module. The physical metric to be sampled in step 502 would correspond to the detector utilized. The identification of the user may then be determined in step 503 and displayed in step 504.

Figure 6:
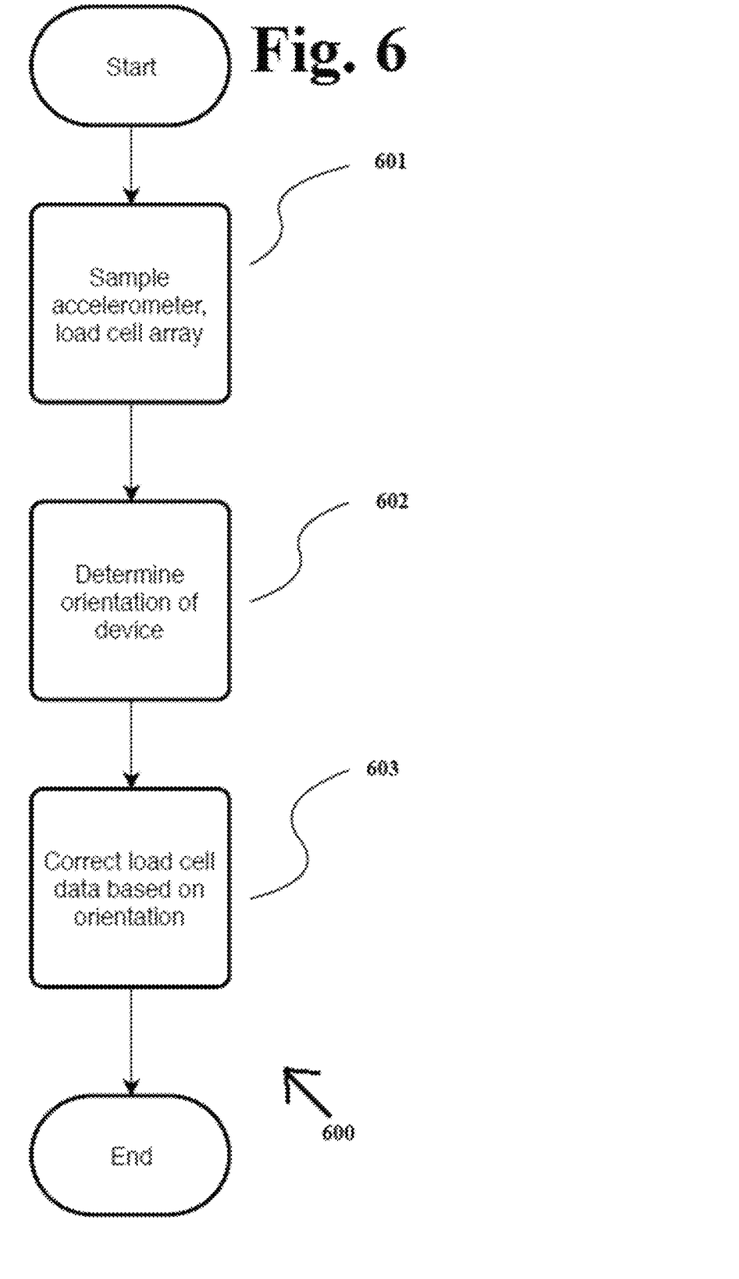
FIG. 6 shows an exemplary process performed by a force detector to compensate for device orientation.

Referring to FIG. 6, describes an embodiment of a process 600 that a detector may use to determine the force placed on a device. This process 600 compensates for the orientation of the device. In step 601, an array of load cells and an accelerometer are sampled. In step 602 the orientation of the device is determined. In step 603, the load cell data is adjusted based on the orientation of the device. For example, if the device is connected to a 100 kg mass was rotated 45 degrees away from direction of the applied load, then the load data before compensation may read 70.7 kg. After compensation, the load data would read 100 kg (e.g., 70.7/cos(45)=100.

In an embodiment that utilizes spoke type load cells for detectors 202 as described in FIG. 4C, load on the bar can be determined. Load on each cell is determined by measuring the compression and tension forces in each spoke of the load cell. By summing up these forces, load on the cell is determined independent of the direction the load is applied, and is therefore independent of the orientation of the device. For example, a load cell measuring a 10 lb load from a set direction would output the same signal even if the load cell were rotated 45°. By averaging the outputs of detectors 202, load on the device is determined.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the workout sensing system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element (e.g., base, upper panel, lower panel, seal/gasket, etc.) disclosed in one embodiment may be incorporated or utilized with any other embodiment disclosed herein.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A workout sensing system, comprising:
   a plurality of elongated bars, each elongated bar being distinct and having two ends, at least one gripping portion, and electrically inter-connected components embedded within each respective elongated bar;
   the electrically inter-connected components comprising a microprocessor, a detector, a transceiver, and a battery;
   wherein the plurality of elongated bars comprises at least two of: a barbell adapted to accept weights at each of the two ends; a lat bar adapted to couple to a cable coupled to a stack of weights; and a close-grip seated row bar adapted to couple to the cable coupled to the stack of weights; and
   wherein the at least two of the barbell, the lat bar, and the close-grip seated row bar are selectively utilized in a strength training activity to track the strength training activity using the respective electrically inter-connected components of the workout sensing system.

2. The workout sensing system of claim 1, wherein the electrically inter-connected components further comprise a display electrically connected to the microprocessor.

3. The workout sensing system of claim 1, wherein the electrically inter-connected components are configured to detect a number of repetitions performed during the strength training activity.

4. The workout sensing system of claim 1, wherein the electrically inter-connected components are configured to determine a force vector exerted on and a distance traveled of the selected utilized elongated bar.

5. The workout sensing system of claim 1, wherein the electrically inter-connected components are configured to determine a mass connected to the selected utilized elongated bar.

6. The workout sensing system of claim 1, wherein the electrically inter-connected components are configured to determine time duration of the strength training activity.

7. The workout sensing system of claim 1, wherein the electrically inter-connected components are configured to determine a user's identification.

8. The workout sensing system of claim 1, wherein the electrically inter-connected components are configured to wirelessly transmit data collected during the strength training activity.

\* \* \* \* \*